United States Patent [19]

Hovance et al.

[11] 3,833,788
[45] Sept. 3, 1974

[54] WELD HEAD POSITION CONTROL SYSTEM

[75] Inventors: Hubert Thomas Hovance, Ravenna; Michael Joseph Tobin, Medina, both of Ohio

[73] Assignee: Miller Electric Mfg., Co., Appleton, Wis.

[22] Filed: Aug. 16, 1972

[21] Appl. No.: 280,989

[52] U.S. Cl............................ 219/124, 219/125 PL
[51] Int. Cl................................................. B23k 9/12
[58] Field of Search.......... 219/124, 125 R, 125 PL, 219/131 F

[56] References Cited
UNITED STATES PATENTS
2,747,152  5/1956  Greene................... 219/125 PL UX
3,217,204  11/1965  Nonce.................... 219/125 PL UX Primary Examiner—C. L. Albritton
Attorney, Agent, or Firm—Sughrue, Rothwell, Mion, Zinn & Macpeak

[57] ABSTRACT

A control system adapted to guide a weld head in a welding position along a seam configuration by positioning a probe, which is attached to the weld head, in a closely spaced floating relation to the weld seam. The probe and associated weld head are mounted on a motorized slide. The probe provides a signal having a magnitude inversely proportional to the distance from the weld seam, and this signal is used to energize the motorized slide in either the forward or reverse directions to maintain the probe within a predetermined range away from the seam.

7 Claims, 3 Drawing Figures

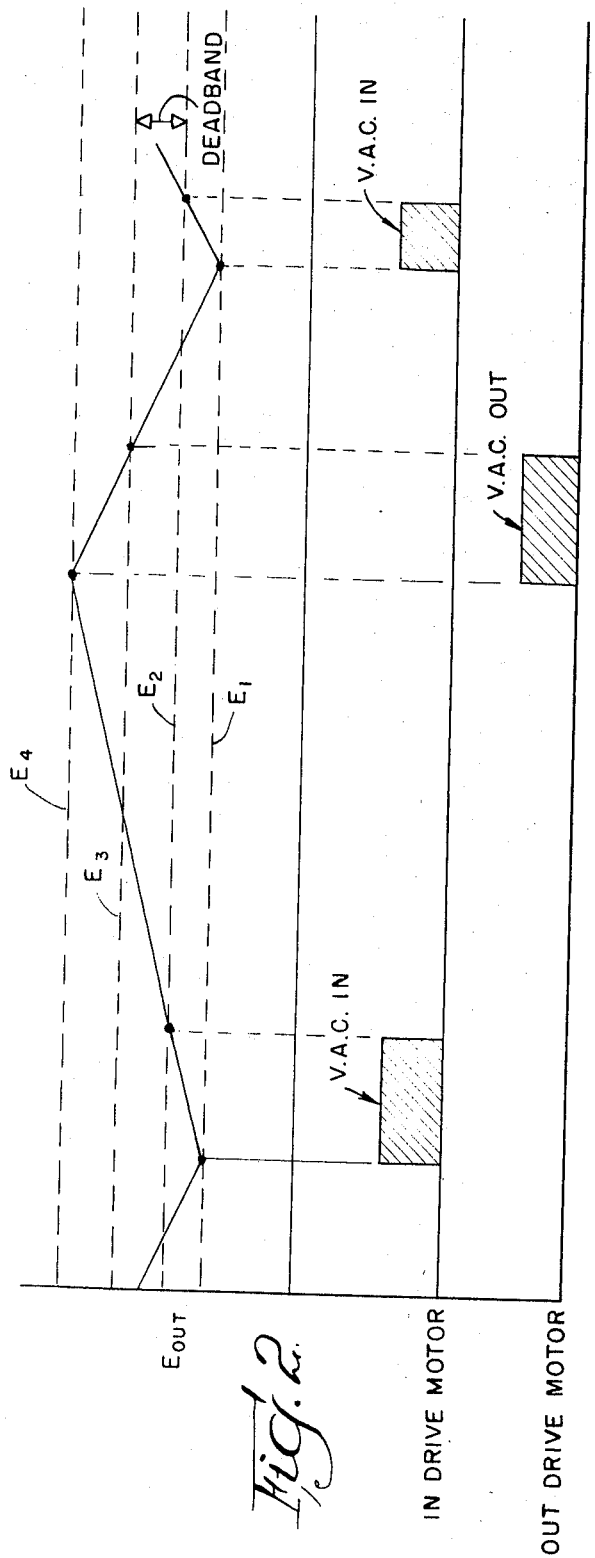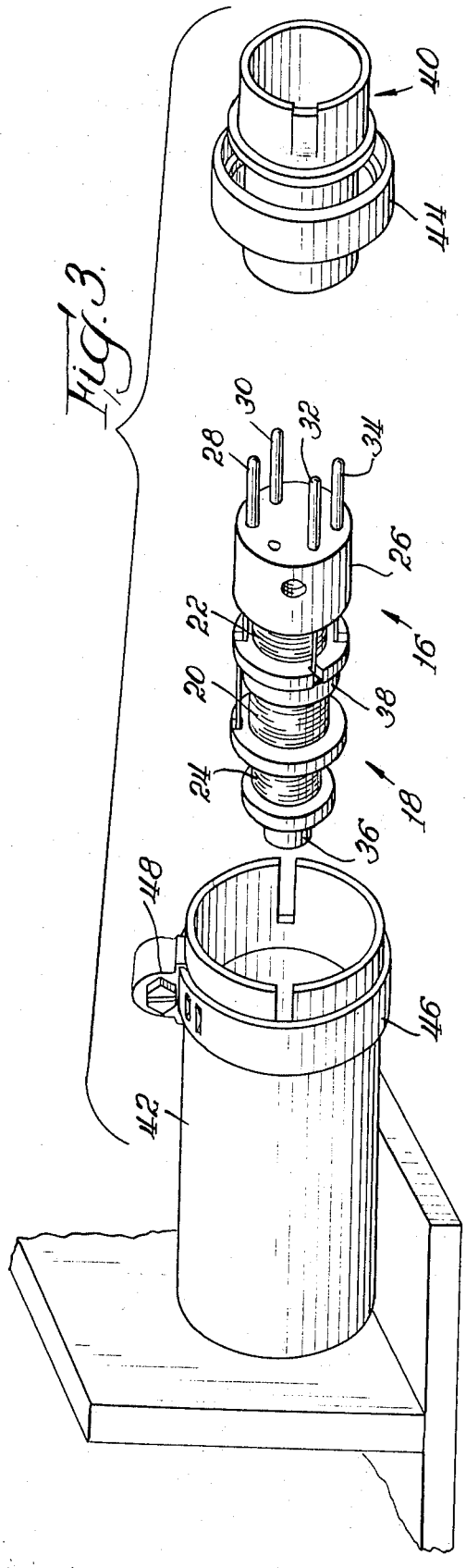

WELD HEAD POSITION CONTROL SYSTEM

BACKGROUND OF THE INVENTION

This invention relates to a probe position control system suitable for causing a weld head to follow a seam.

There are several known prior art systems for guiding a weld head along a seam configuration. Generally, these systems use a motorized car to move the weld head assembly along the weld seam at a welding speed and the weld head assembly uses a mechanical roller or follower to ride on the workpiece and thereby follow the seam's contour. However, the use of the mechanical roller in these systems is often unsatisfactory due to frequent damage to the roller and its poor tracking ability.

The disadvantages of using a roller or the like are avoided in this invention by employing a probe that does not touch the weld seam. The probe of this invention operates as a proximity sensor floating a small incremental distance away from the workpiece. In particular, this invention relates to a probe design and a control system for positioning the probe away from the weld seam within a predetermined range of incremental distances.

SUMMARY OF THE INVENTION

A control system for positioning a probe away from a metallic workpiece within a predetermined range of incremental distances is designed as a means to guide a weld head attached to the probe in a welding position along the seam configuration. The probe is mounted on a slide drive motor having an IN winding for driving the probe towards the seam and an OUT winding for driving it in the opposite direction. The probe comprises a differential transformer which is designed to provide a signal having a magnitude inversely proportional to the distance from the workpiece. This signal is fed into a threshold detector means which is responsive to four increasing magnitude levels of the probe's output signal. At the first magnitude level, the threshold detector means energizes the IN winding of the drive motor to move the probe inward, and deenergizes the IN winding at the second magnitude level. The OUT winding is energized at the fourth magnitude level and deenergized at the third magnitude level.

DESCRIPTION OF DRAWINGS

For a better understanding of this invention reference may be made to the accompanying drawings, in which:

FIG. 2 is a plot of voltage vs. time illustrating the voltage relationships of the various units in the control system of FIG. 1; and FIG. 3 is an exploded view of the components that make up the probe assembly.

DESCRIPTION OF PREFERRED EMBODIMENT

Figure 1:
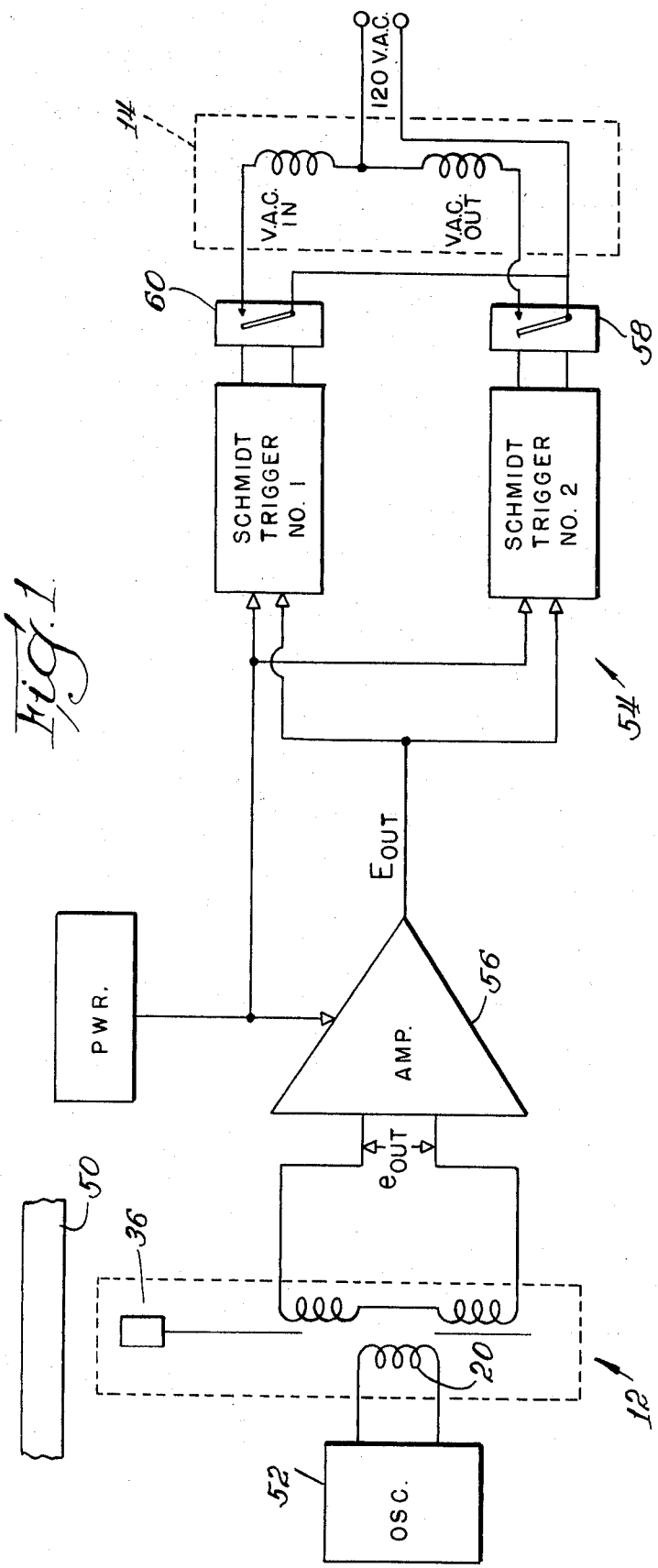
FIG. 1 is a control system in block diagram form embodying the principles of this invention.

Referring to FIG. 1, there is shown a block diagram of the control system which embodies the principles of this invention and is generally designated by the reference numeral 10.

Control system 10 is capable of guiding a probe assembly 12 to follow the contours of a metallic workpiece such as a weld seam. The probe assembly 12 and weld head (not shown) would be mounted on a slide assembly (not shown) which is driven by slide drive motor 14. The slide assembly is moved along the weld seam at welding speed by a motorized car. Generally, two individually controlled slide assemblies are used — one for the vertical variations of the seam and the other for the seam's horizontal variations. The use of a motorized car and slide assembly for this purpose are well known in the art and form no part of this invention. This invention is directed to a new control system and probe assembly that provides better tracking of the weld seam variations than heretofore possible.

As depicted in FIG. 3, probe assembly 12 comprises a teree-coil three-coil transformer 16 assembled on a three-sectioned bobbin 18 having a center input coil 20 and two output coils 22, 24 in a coaxial arrangement. A plug connector 26 is attached to one end of bobbin 18, and the leads of input coil 20 are connected to pins 28, 30. The output coils 22, 24 are electrically connected in polarity opposition through pins 32, 34.

In order to obtain more equal voltage opposition across output coils 22, 24, a ferrite core 36 is inserted through the center of bobbin 18 and secured in place at the lowest voltage null position. The ferrite core has a brass threaded rod at its inner end (not shown) for axial adjustment purposes. This position adjustment is made by finding the minimum AC voltage output. However, this voltage will not reach zero due to a small phase difference between the front and rear coils 22, 24. Because the heat of the welding arc affects this setting, it is preferred that the bobbin 18 be made of a material having a coefficient of expansion close to that of the ferrite core 36, such as Fluorosint (a filled Tetrafluoro-ethylene material).

To get the closest possible null voltage, a copper band 38 is disposed around the input coil. The copper band 38 by changing the inductance of the differential transformer permits the resultant output of the output coils 22 and 24 to be adjusted to a very low voltage of the order of 1/10 volt. This adjustment is made by moving the band 38 axially and soldering it in place at the minimum output position. Alternatively, the band 38 could be replaced by a few turns of copper wire wrapped around the input center coil and positioned in the same manner.

Plug housing 40 is slipped over plug 26 and bonded to plug 26. The entire bobbin unit is then inserted into the open end of sleeve 42 such that collar 44 underlies clamp 46. Finally, lock band 48 is tightened to securely clamp the bobbin unit in place.

The probe assembly 12 is schematically shown in FIG. 1 with the ferrite core 36 disposed adjacent to weldment 50 and with input coil 20 driven by an oscillator 52 having a high frequency signal. It will be appreciated that as the probe assembly with core 36 is moved towards weldment 50, the probe output voltage $e_{out}$ proportionally increases. This output voltage $e_{out}$ is amplified and rectified by amplifier 56 to produce a D-C filtered voltage $E_{out}$. This output voltage is used to selectively energize the IN and OUT windings of slide drive motor 14. When the IN winding is energized, probe assembly 12 and associated weld head are moved toward weldment 50. Contrariwise, energizing OUT winding moves the probe assembly away from the weldment.

The selective energization of the slide drive motor windings is provided by a threshold detector means 54 which is responsive to four increasing magnitude levels of output voltage $E_{out}$. When the lowest of the magnitude levels occurs, threshold detector means 54 energized the IN winding to cause probe 12 to move towards weldment 50. As the second magnitude level is reached, the IN winding is deenergized. When the highest level occurs, threshold detector means energizes the OUT coil causing the probe 12 to move away from weldment 50, until the third magnitude level is reached whereupon the OUT coil is deenergized.

Threshold detector means 54 comprises a pair of Schmidt trigger circuits No. 1 and No. 2 connected in parallel across the output of amplifier 56. Trigger No. 1 is set to be responsive to the first and second magnitude levels of $E_{out}$, for energizing and deenergizing, respectively, the IN coil of motor 14. Trigger No. 2 is designed to operate at a higher input voltage in order to be responsive to the third and fourth magnitude levels of $E_{out}$ for deenergizing and energizing the OUT coil of motor 14.

Referring to FIG. 2, there is shown a voltage plot for $E_{out}$. The four dotted lines marked $E_1$, $E_2$, $E_3$ and $E_4$ represent the four magnitude levels at which the threshold detector means 54 is set to operate. At voltage $E_4$, Schmidt trigger No. 2 is set to operate and when energized provides an enabling signal for switch means 58, such as an SCR switching circuit, to thereby close the current path to the OUT coil of motor 14. The motor will then drive the probe assembly 12 away from weldment until $E_{out}$ drops to the $E_3$ magnitude level. At $E_3$, Schmidt trigger No. 2 is turned off causing the deenergization of the OUT coil.

When the distance between the probe core 36 and weldment 50 increases to cause voltage $E_{out}$ to drop to the $E_1$ magnitude level, Schmidt trigger No. 1 is pre-set to turn ON and thereby provides an enabling signal for switch means 60, which could also be an SCR switching circuit. This actuation of switch means 60 closes the current path to the IN coil. Motor 14 then drives probe assembly 12 towards weldment 50 until $E_{out}$ rises to the $E_2$ magnitude level, and at $E_2$ voltage Schmidt trigger No. 1 turns off, causing the deenergization of the IN coil.

From the foregoing description, it can be seen that the control system of this invention maintains the probe core 36 within a predetermined range of distances from the weldment 50, where magnitude level $E_4$ corresponds to the minimum end of this predetermined range and $E_1$ corresponds to the maximum end. This range can be set to be quite small as shown by the following table compiled from actual test results:

| Probe-to-Weldment (Steel) Distance (Inches) | Probe Output Voltage $e_{out}$ (Peak-to-Peak) | Amplified Output Voltage $E_{out}$ (D.C.) | |
|---|---|---|---|
| .25 | .15 | 8.0 | $E_4$ |
| .27 | .14 | 7.4 | $E_3$ |
| .28 | .13 | 6.8 | $E_2$ |
| .30 | .11 | 5.2 | $E_1$ |

One of the major advantages of the control system of this invention is the individual control of the IN and OUT coils of motor 14. There is no possibility that the two coils will be simultaneously energized since there is a definite deadband (defined by the difference between magnitude levels $E_3$ and $E_2$) during which neither coil is energized. By providing this deadband, it avoids the possibility of simultaneously energizing both IN and OUT coils of the slide motor and thereby avoids a disadvantage of prior art control systems. Furthermore, since the Schmidt trigger turns on at one voltage and off at a lower voltage and can not turn on again until raised to the higher on voltage, there is no possibility that the drive motor will be pulsed on and off as a result of very slight variations in the weldment or vibration in the support structure.

I claim:

1. In a control system for positioning a probe relative to a metallic workpiece to maintain the spacing between the probe and the workpiece within a predetermined range defined by first and second limits, an electric slide drive motor having one winding which when energized causes said probe to move toward said workpiece and another winding which when energized causes said probe to move away from said workpiece, proximity sensing means including said probe for providing an output signal having a magnitude inversely proportional to the spacing between the probe and said workpiece, threshold detector means responsive to an output signal at a first level provided whenever the probe to workpiece spacing reaches said first limit to energize said one winding to cause said probe to move toward said workpiece, and thereafter to deenergize said one winding when the output signal increases to a second higher level when the probe to workpiece spacing is within said predetermined range said threshhold detector means being responsive to an output signal at a fourth level, which is higher than said second level, provided whenever the probe to workpiece spacing reaches said second limit to energize said another winding to cause said probe to move away from said workpiece, and thereafter to deenergize said another winding when said output signal decreases to a third level, which is higher than said first level, when the probe to workpiece spacing is within said predetermined range.

2. A control system as defined in claim 1, wherein said probe comprises a differential transformer having an input coil, two output coils coaxially disposed on opposite sides of said input coil and electrically connected together in polarity opposition to provide a probe output voltage, and a magnetic permeable core extending through the center of said coils and positioned for lowest null probe output voltage.

3. A control system as defined in claim 2, wherein said probe further comprises a copper null adjusting band disposed about said input coil and positioned axially to produce the lowest possible null probe output voltage.

4. A control system as defined in claim 2, wherein said proximity sensing means comprises an oscillator for energizing said input coil and an amplifier for amplifying said probe output voltage.

5. A control system as defined in claim 1, wherein said threshhold detector means comprises a pair of Schmidt triggers connected in parallel to the output of said proximity sensing means, one of said Schmidt triggers being energized by an output signal at said first level and being deenergized by an output signal at said second level, and the other of said Schmidt triggers being energized by an output signal at said fourth level and being deenergized by an output signal at said third level.

6. In a control system for positioning a probe relative to a metallic workpiece to maintain the spacing between the probe and the workpiece within a predetermined range defined by first and second limits, an electric slide drive motor having a first winding which when energized causes said probe to move toward said workpiece and a second winding which when energized causes said probe to move away from said workpiece, proximity sensing means including said probe for providing an output signal related in amplitude to the spacing between the probe and the workpiece, first switching means enabled whenever the amplitude of said output signal reaches a first level when the probe to workpiece spacing reaches said first limit to energize one of said windings, said first switching means being disabled to deenergize said first winding when the amplitude of said output signal reaches a second level which corresponds to a probe to workpiece spacing within said predetermined range, and second switching means enabled whenever the amplitude of said output signal reaches a fourth level when probe to workpiece spacing reaches said second limit to energize the other one of said windings, said second switching means being disabled to deenergize said other winding when the amplitude of said output signal reaches a third level which corresponds to a probe to workpiece spacing within said predetermined range, said first and third levels and said fourth and second levels being selected to prevent said first and second windings from being energized simultaneously.

7. In a control system for positioning a probe relative to a metallic workpiece to maintain the spacing between the probe and the workpiece within a predetermined range defined by first and second limits, an electric slide drive motor having a first winding which when energized causes said probe to move toward said workpiece and a second winding which when energized causes said probe to move away from said workpiece, proximity sensing means including said probe for providing an output signal related in amplitude to the spacing between the probe and the workpiece, said probe including a differential transformer having an input coil connected to oscillator means for energizing said input coil and a pair of output coils electrically connected together in polarity opposition to normally provide a null output signal whenever the probe to workpiece spacing is approximately at the middle of said predetermined range and to provide an output signal of a first polarity whenever the probe to workpiece spacing increases toward one of said limits and an output signal of a second polarity whenever the probe to workpiece spacing decreases toward the other of said limits, and means responsive to the output signals provided by said proximity sensing means to selectively energize said first and second windings to maintain the probe to workpiece spacing within said predetermined range.

* * * * *